United States Patent [19]

Foret et al.

[11] 3,798,422

[45] Mar. 19, 1974

[54] TICKET READER

[75] Inventors: Pierre G. Foret, Sudbury; John William Donohoe, Natick, both of Mass.

[73] Assignee: Dennison Manufacturing Company, Framingham, Mass.

[22] Filed: Mar. 9, 1972

[21] Appl. No.: 233,375

Related U.S. Application Data

[62] Division of Ser. No. 56,281, July 20, 1970, Pat. No. 3,689,065.

[52] U.S. Cl. ......... 235/61.11 R, 198/209, 214/1 BH

[51] Int. Cl. ... G06k 7/00, G06k 7/015, G65g 29/00

[58] Field of Search ....... 340/174.1 C; 235/61.11 D; 214/1 BH; 198/209; 353/25, 107, 117; 274/4 J

[56] References Cited

UNITED STATES PATENTS

| | | | |
|---|---|---|---|
| 2,905,466 | 9/1959 | Azari et al. | 271/27 |
| 3,020,355 | 2/1962 | Moriya | 179/100.2 T |
| 3,562,727 | 2/1971 | Abbott et al. | 340/174.1 C |

OTHER PUBLICATIONS

IBM Technical Discl. Bull. May et al., "Random File," Vol. 9, No. 12, 5/67 p. 1717, 1718.

*Primary Examiner*—Thomas J. Sloyan
*Attorney, Agent, or Firm*—Dike, Bronstein, Roberts & Cushman

[57] ABSTRACT

A ticket reader which has a rotatable turret and a vacuum system for moving tickets between different stations, one or more of the stations being adapted to provide tickets, one of the stations including a reader for reading the tickets, and a plurality of the stations adapted to receive the tickets after they have been read and interpreted.

10 Claims, 17 Drawing Figures

TICKET READER

This is a division, of application Ser. No. 56,281, filed on July 20, 1970 now U.S. Pat. No. 3,689,065, issued Sept. 5, 1972.

BACKGROUND OF THE INVENTION

This invention is directed to a system for reading information written on a recording media, and is more particularly directed to a new and improved high speed ticket reading and sorting device.

There are many different machines available for reading relatively large, punched cards and the like and for sorting out cards carrying certain information from a batch of cards.

The most prevalent type of card or ticket reader (and/or sorter) available is one that relies upon the undirectional movement of a card along a machine bed by the use of mechanical feelers or pushers. Such systems have been found to be quite useful particularly in cases where the card contains holes which are sensed by feelers at a reading station.

Although the above type of card reader is quite suitable for reading large cards, transport problems as well as reading difficulties are encountered where the cards are reduced in size, as for example where the size of the card or ticket is more suitably dimensioned for affixing to merchandise (e.g., clothes) to indicate inventory and price information.

The above mentioned types of card readers are also not readily adaptable or modifiable for rapidly reading information stored in a magnetic media carried by the card. Such types of cards or tickets containing a magnetic media are beginning to become widely used in inventory control systems, e.g., in merchandising of clothes, etc., wherein small tickets are affixed to the merchandise and then collected by the cashier for processing when the merchandise is sold.

Difficulties particularly arise in accurately positioning the small card (or ticket) with respect to a magnetic reading head in order to detect the data stored on the ticket.

It therefore became apparent that a new and improved ticket reader was required for use in reading small dimensioned tickets and in particular to provide means for rapidly reading and sorting tickets containing a magnetic media thereon. In addition, a new and improved ticket reader and sorter was required which would be capable of rapidly reading information stored on a ticket and which would also be capable of being controlled from a computer.

In view of the above requirements, this invention provides a new and improved ticket reader and sorter which broadly includes means for drawing a ticket on to a support from means for storing a plurality of tickets and thereafter transferring the ticket to a reading station.

The ticket reader and sorter of this invention also provides means for sorting the tickets depending on the information or lack of information carried by the tickets. Accordingly, it is an object of this invention to provide a new and improved ticket reader and/or sorter.

It is a further object of this invention to provide a new and improved device for transferring a ticket from means for holding a batch of tickets to one or more positions where the ticket is read and/or sorted.

It is an additional object of this invention to provide a new and improved device for receiving a ticket and for thereafter rotating the ticket to a plurality of different positions.

It is another object of the invention to provide a new and improved means responsive to an external device (e.g., computer) which has interpreted information on a ticket carried by the device for selectively ejecting the ticket from the device.

It is yet another object of the invention to provide new and improved means for feeding tickets from stackers carrying the same onto a turret adapted to move between stations.

Still other objects and advantages will in part be obvious and will in part be apparent from the specification. The invention accordingly, comprises the features of construction, combination of elements, and arrangement of parts which will be exemplified in the construction hereinafter set forth, as well as the several steps and the relation of one or more of such steps with respect to each of the others which is exemplified in the following detailed description, and the scope of the invention will be indicated in the claims.

DESCRIPTION OF THE PREFERRED EMBODIMENT

Figures 1, 2, 3, 4, 14, 15:
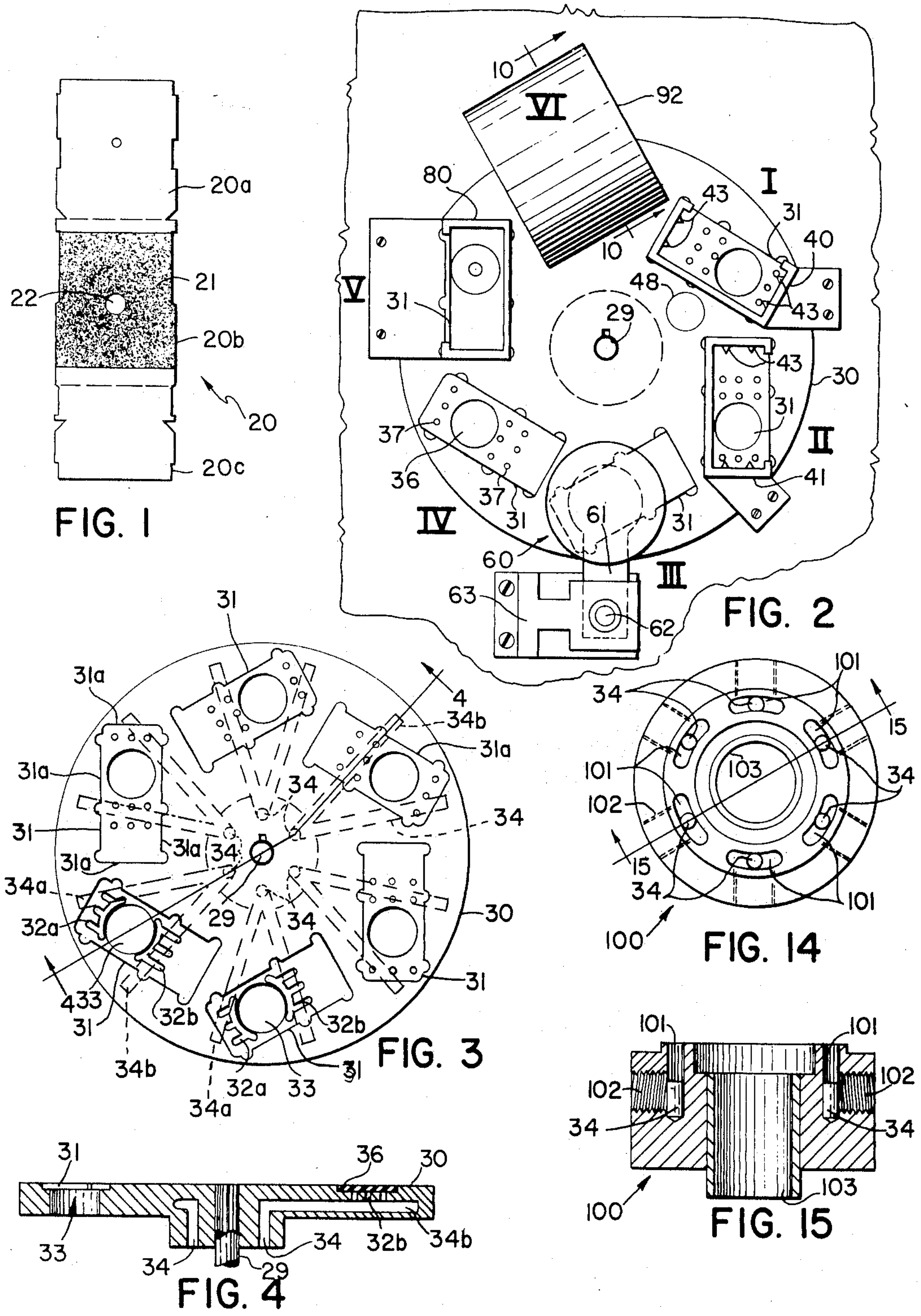
FIG. 1 is a top view of one type of ticket suitable for use in conjunction with this invention.
FIG. 2 is a top view showing the construction of the turret as well as the relationship of the various devices (e.g., reading mechanism, feed bins, etc.) positioned above the turret according to the invention.
FIG. 3 is a top view of the turret shown in FIG. 2, but in more detail and with certain parts removed.
FIG. 4 is a sectional view taken along line 4—4 of FIG. 3.
FIG. 14 is a top view of a rotary seal used in conjunction with the turret passages.
FIG. 15 is a sectional view taken along line 15—15 of FIG. 14.

Reference should now be had to FIG. 1 which shows one type of card or ticket which may be read and sorted by the machine of this invention. The ticket is shown at 20 and includes three sections 20*a*, 20*b* and 20*c*, which may be separated from each other. In use, the portion 20*a* is normally separated from sections 20*b* and 20*c* and these latter sections are collected by the cashier selling the merchandise for later processing.

It should be understood that the machine of this invention may be used for reading many different types of tickets including the one shown in FIG. 1 and whether or not the parts of the ticket are separated as long as a portion of a ticket equivalent to 20*b* is provided. Section 20*b* includes a magnetic media 21, (e.g., magnetic material tape, magnetic material coating, etc.) affixed thereto (e.g., by gluing) adapted for the storage of information thereon. In addition, section 20*b* is preferably provided with a hole 22 to facilitate the processing of the ticket in the machine of the invention. The hole 22 acts as a centering or aligning means in conjunction with the means for reading information on the magnetic media of the ticket. (See copending U.S. Pat. application Ser. No. 681,730, filed Nov. 9, 1967, assigned to the same assignee as this application for a description of a suitable ticket). In addition, the hole 22 facilitates the stacking of tickets on a spindle of one or more of the stackers as will be more fully described in conjunction with the description which follows.

In FIG. 2 there is shown in a top view the general layout of the machine cabinet (in broken line) of the invention. A rotatable and indexable turret 30 positioned in the cabinet and preferably flush with the top surface thereof is provided. The turret 30 is preferably in the shape of a disc having a central hub mounted on a shaft 29. The turret includes six ticket receivers 31 spaced about the top surface for positioning the ticket in the receiver and with respect to an opening or hole 33 described below. The ticket receivers 31 are preferably formed by providing a plurality of shaped recessed areas or cavities (e.g., machined or cast) as shown more particularly in FIGS. 3 and 4 and having a plurality of guide means 31*a*. The receivers 31 are also provided with channels or fluid or vacuum directing portions 32*a* and 32*b* (preferably formed in the bottom thereof) which are positioned about an opening hole 33 which extends through the turret. The opening 33 is provided to permit ejecting means, to be described later, to push a ticket out of the receiver and into a stacker or the like. The channel portions 32*a* and 32*b* cooperate with fluid or vacuum passages 34*a* and 34*b* formed in the turret (e.g., by drilling holes in from the turret side and thereafter plugging the end). The passages extend inwardly towards the center of the turret and then downwardly as shown. The passages are provided to permit suction (vacuum) to be applied through the turret from a source of vacuum (see FIG. 12) to draw or suck air out of said passages and draw a ticket from a stacker onto or into a receiver 31 of the turret and to hold the ticket on or in the receiver during the movement of the turret between stations. Positioned within the receivers 31, as shown in FIG. 2, are preferably compliant backings 36 (e.g., of rubber, plastic, or the like) which are preferably shaped to encircle the hole 33.

The compliant backing is provided with a plurality of holes or openings 37 extending therethrough and which are preferably positioned above, and in register with channels 32*a* and 32*b* so as to direct the applied vacuum. The compliant backing is preferably mounted within the receiver recess (e.g., by gluing to the bottom thereof) so that all vacuum or suction provided through the channels 32*a* and 32*b* is directed through the holes 37 and not around the sides of the compliant backing. In this manner the compliant backing in effect acts as a seal. It is also advantageous for processing tickets if the backing has a relatively high coefficient of friction so the tickets don't readily turn when positioned thereon.

Referring again to FIG. 2, the reader is shown as having six stations (numbered I–VI) between which the turret moves to position tickets and or receives tickets. At stations I and II there are provided input stackers 40 and 41 for holding tickets to be processed by the reader. The reason that two input stackers are provided is to permit continuous operation of the reader by permitting one stacker to be filled, by an operation, while the other stacker is providing tickets. It should be understood that the machine functions perfectly well with only one stacker instead of the two shown. At the bottom of the stackers there are provided downward going projections 43 for preventing more than one ticket from being carried away by the receiver. The projections 43 are long enough to essentially act as slicer to permit only one ticket of the stack of tickets supported on top of the turret to enter the receiver and to be carried away therein. When the receiver is not present and the tickets are supported by the turret top surface, the projections 43 prevent any further tickets from leaving stacker.

The projections are such that only one ticket may be drawn onto the receivers compliant backing when vacuum is applied to the receiver. It should also be understood that a spindle type stacker can also be used to feed tickets to the turret.

Figures 5, 5A, 5B, 6, 7, 8:
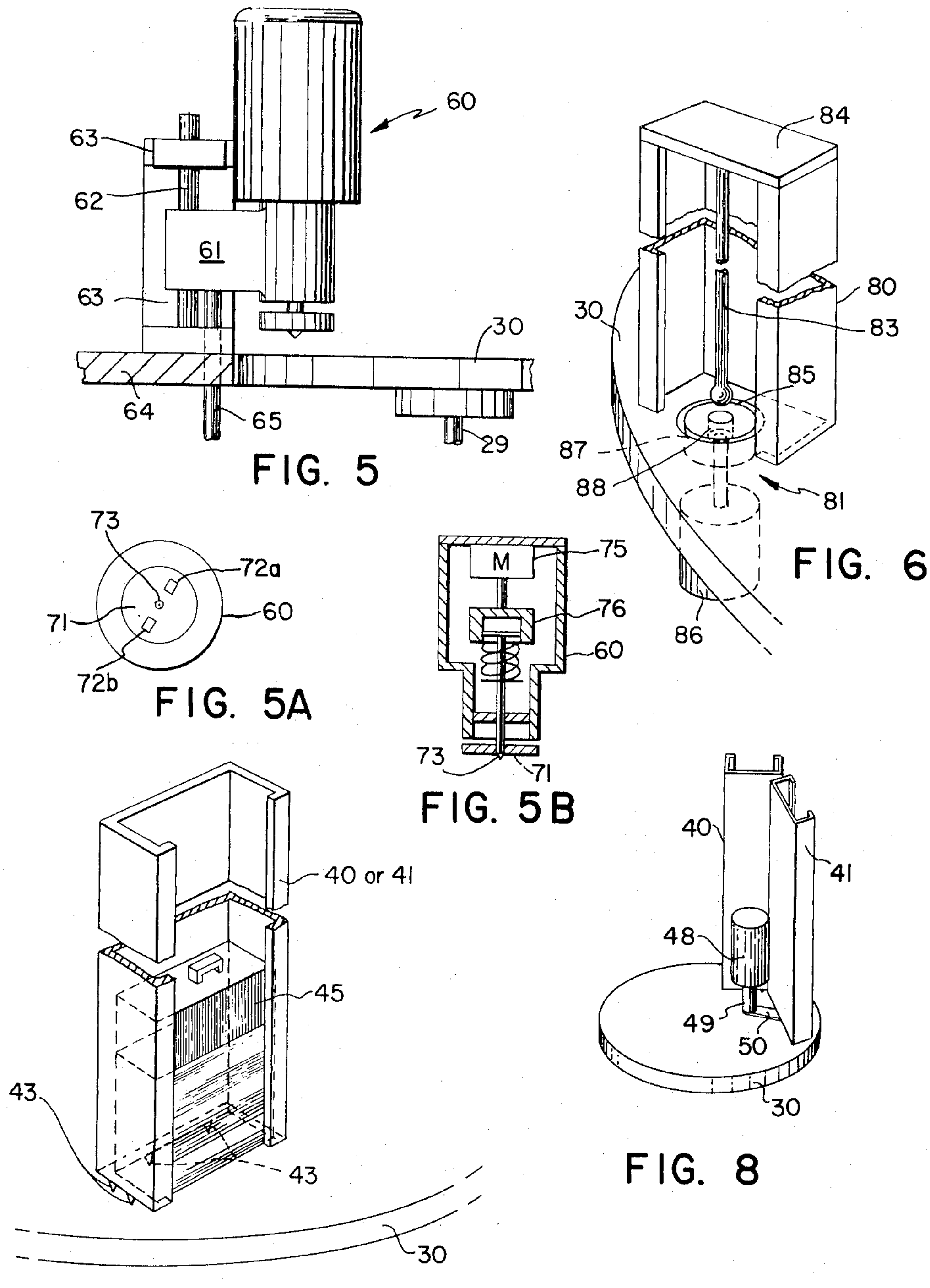
FIG. 5 is a side view showing the magnetic reading assembly used in the invention.
FIG. 5A is a bottom view of a portion of the magnetic reading device according to the invention.
FIG. 5B is a side diagrammatic view of the magnetic reading device according to the invention.
FIG. 6 is a view showing a stacker positioned and an ejector for pushing a ticket from the turret onto the collector.
FIG. 7 shows a view of one of the input stackers according to the invention.
FIG. 8 shows a view of the position of two input stackers and the position of means for preventing the release of tickets from one of the stackers.

In FIG. 7 there is shown the stacker 40 or 41 having tickets positioned therein. A weight 45 is positioned in the stacker for holding down the tickets on the turret downward.

FIG. 8 shows the two stackers 40 and 41 (cabinet top supported) in a back view positioned above the turret. In order to prevent tickets from leaving one of the stackers (e.g., when it is being refilled or when both stackers are full) there is provided a rotary solenoid 48 having a shaft 49 with a wiper arm 50 attached thereto. The wiper arm 50 is adapted to move between the bottom of the stackers 40 and 41 and the top of the turret to prevent tickets from leaving the stacker.

At station III there is provided means for reading information recorded on the magnetic storage media 21 of the ticket 20. In the preferred manner of using the tickets, information has been written on the magnetic media in one or more circular tracks about the aligning hole 22. A system for writing on tickets in circular tracks as well as a system for reading such tickets is shown in the U.S. Pat. application of Richard F. Stucchi entitled Marking System, Ser. No. 787,294, filed Dec. 9, 1968 and assigned to the same assignee as the present invention.

The construction of magnetic reading assembly is shown more fully in FIGS. 2, 5, 5A, 5B, 12 and 13. At 60 there is shown a magnetic read assembly which is adapted to move up and down in relation to the turret 30. This is accomplished by the provision of member 61 slidably movable (up and down) about a guide rod 62 positioned in support member 63 which is itself attached to the machine cabinet shown at 64. The member 61 is provided with a rod 65 having a cam follower 66 at one end thereof. The cam follower 66 is driven by an eccentric cam 67 mounted on a shaft 68 driven through a clutch-brake arrangement 69 which is coupled to a drive motor 70.

FIGS. 5A and 5B show in more detail the construction of the magnetic read assembly 60. At 71 there is shown a disc having magnetic reading heads **72*a* and 72*b* mounted therein and adapted to rotate therewith. In the center of the disc is positioned a ticket aligning pin 73. The pin 73 is adapted to enter the hole 22 of the ticket 20 in order to position the magnetic media 21 (i.e., the information tracks thereon) with respect to the heads 72*a* and 72*b*. The disc 71 is rotated by a motor 75 shown diagrammatically positioned within the head assembly 60. The shaft coupled between the motor 75 and the disc 71 is preferably constructed with a spring type coupling 76 (shown enlarged) so that the disc 71 and the pin 73 may move vertically to aid in the positioning of the ticket 20**. The electrical connections for coupling the heads are accomplished with rotary couplings well known in the art. For additional description of a suitable magnetic head assembly reference should be had to the aforementioned U.S. patent application.

In the preferred form of the machine as presently constituted, station IV is an unused station although it should be understood that additional readers (e.g., readers adapted to read print or other information carried by the ticket, or output stackers or collectors can be provided as shown at stations V and VI to be described below.

At station V there is provided a stacker and ejector arrangement for collecting tickets depending on the information or lack of information detected at the reading station III. The stacker is shown at 80 in FIGS. 1 and 6, and the ejector or pusher is shown at 81 in FIGS. 6 and 12. The stacker 80 includes a spindle 83 attached at one end to a cover 84 adapted to fit on top of the stacker 80.

The spindle 83 is provided with a bulging nose portion 85 which is adapted to pass through the hole or opening 22 of the ticket 20 and at the same time retain the ticket on the spindle after the ticket has been pushed past the nose portion. The ejector 81 comprises a cylinder 86 (e.g., pneumatic or hydraulic) for moving an ejector head 87 from under the turret 30 and through the opening 33 of the receiver 31 against the underside of the ticket 20 positioned on the receiver. The ejector head 87 forces the ticket upwardly so that the spindle head 85 passes through the ticket hole 22. To ensure that the ticket is completely forced over the spindle head 85, the ejector head 87 is preferably provided with a bore (e.g., cylindrical) 88 which is adapted to receive the spindle head 85. Thus, as the ejector head 87 rises, the ticket is lifted and forced onto the spindle head 85, and is pushed over the spindle head as the spindle head 85 enters the bore 88.

At station VI there is provided a drop-off assembly for permitting tickets which have been read to be disposed. The drop-off assembly is shown in more detail in FIGS. 2, 10, 11 and 12. The assembly comprises a cylinder 90 (e.g., pneumatic or hydraulic) for moving an ejecting head 91 through the hole 33 of the turret and the receiver 31. The ejecting head 91 pushes the ticket upwardly at a high rate of speed against a deflector portion (preferably curved) of a hood or chute 92 which directs the ticket so that it falls away from the turret and into a bin 93 supported by the machine cabinet 64 or a wastebasket positioned on the floor (not shown).

Reference should now be had to FIGS. 14 and 15 which shows a rotary seal which can be used in conjunction with the turret 30. The rotary seal is shown generally 100 and comprises a plurality of slots, each shown at 101 coupled to a plurality of passageways each shown at 102 and each adapted to be coupled to valves shown in FIG. 12. At 103 there is provided a center hole through which shaft 29 is positioned so that the turret passages 34, can be aligned with the slots 101 as the turret rotates.

Figure 9:
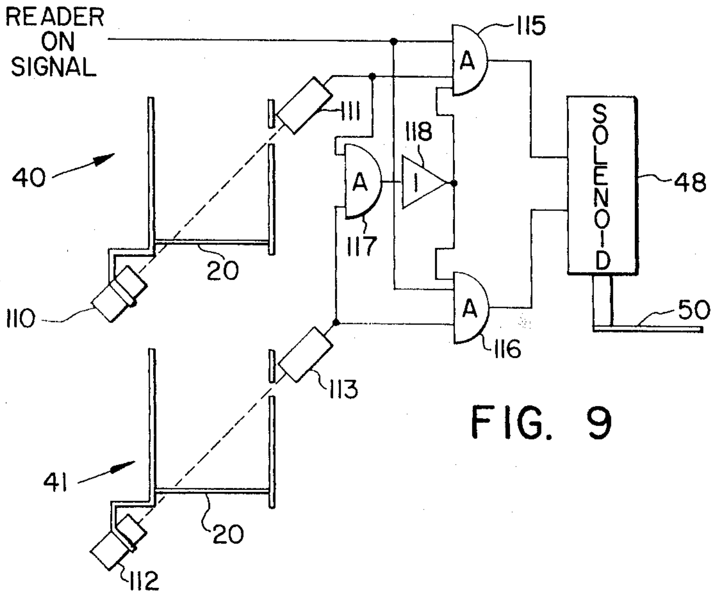
FIG. 9 is a schematic diagram showing means for controlling the means for preventing the release of tickets shown in FIG. 8.
Figure 10:
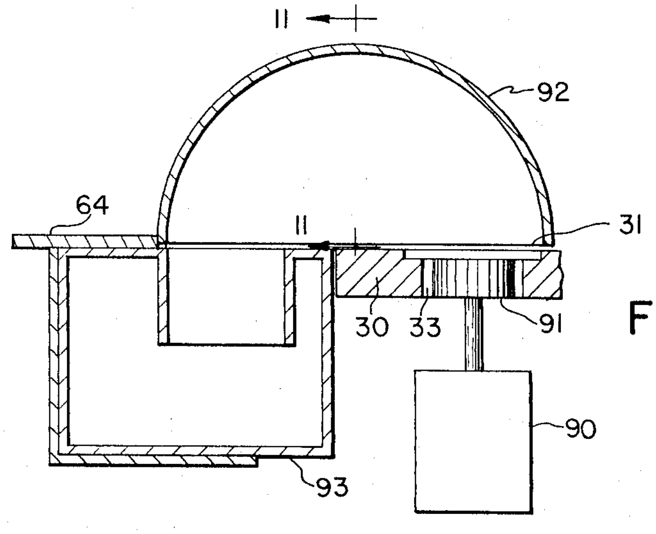
FIG. 10 is a sectional view taken along line 10—10 in FIG. 2.
Figure 11:
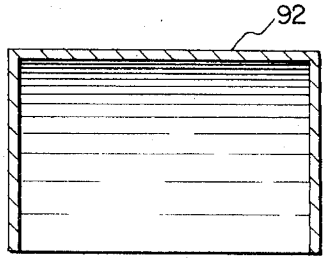
FIG. 11 is a sectional view taken along line 11—11 in FIG. 10.
Figures 12, 13:
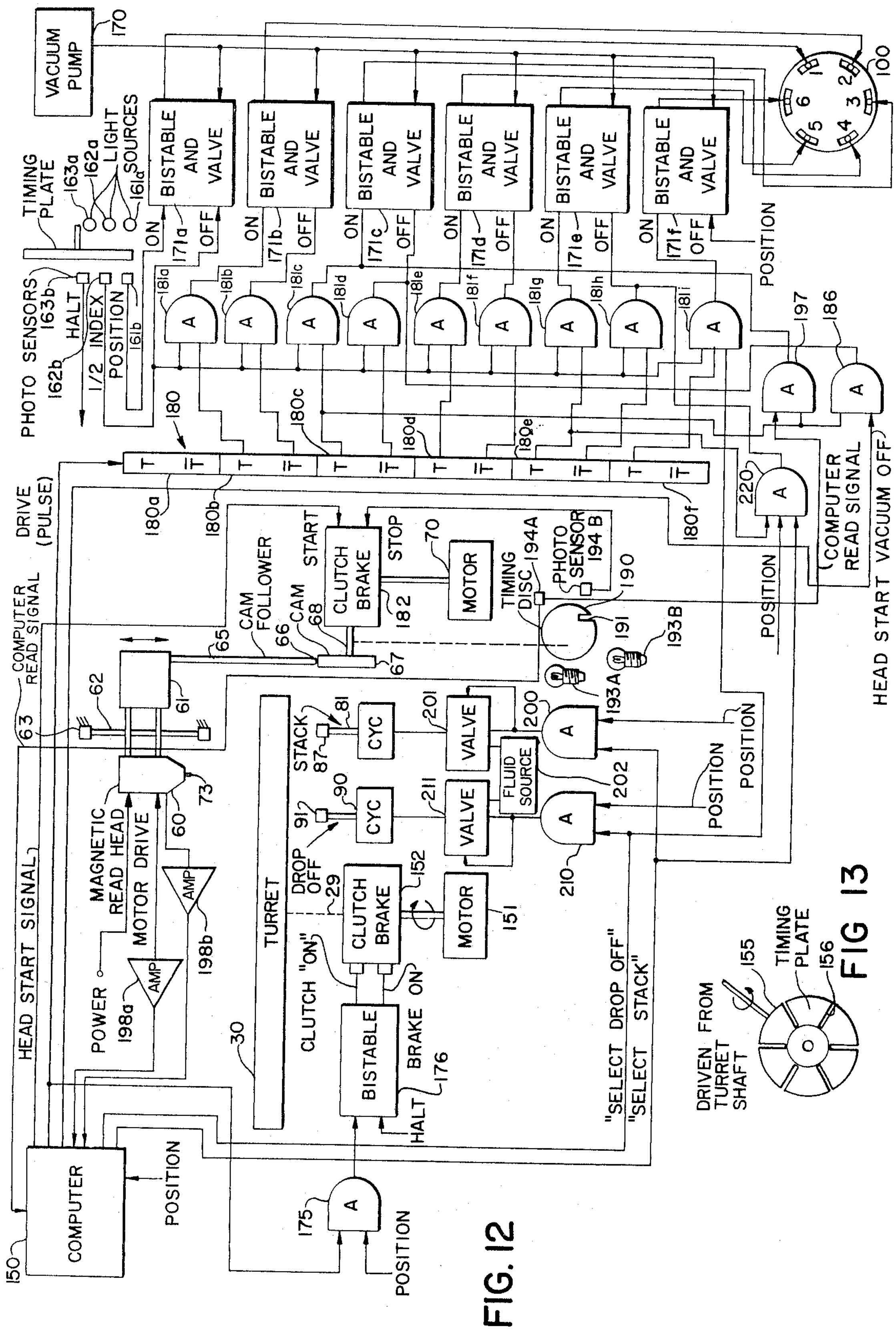
FIG. 12 is a block diagram illustrating the controls for operating the reader of this invention.
FIG. 13 is a view of the timing plate used in FIG. 12.

Before describing the operation of the batch reader in conjunction with FIGS. 12 and 13, reference should now briefly be had to FIG. 9 which schematically shows a device for controlling the operation of the rotary solenoid 48 as well as the position of member 50 with respect to the input stackers 40 and 41. The member 50 is provided, as mentioned previously, to retain tickets within one of the stackers while the other stacker is providing tickets to the turret receivers 31. The member 50 is switched between stackers 40 and 41, when a signal is provided to the rotary solenoid 48 indicating that one of the stackers is empty and that the other (full stacker) should be permitted to feed tickets onto the turret. To accomplish the above there is provided as shown in FIG. 9 a light source 110 and a photo (light) detector 111 associated with stacker 40 and a light source 112 and a photo (light) detector 113 associated with stacker 41. The light sources 110 and 112 are supported by the respective stackers under a sidewall thereof so as to direct a light beam upwardly towards where the ticket would normally be held within the stacker. If it is now assumed that both ticket stackers have tickets stacked therein the retainer member 50 will be either under stacker 40 or 41. No signal will be detected by the detectors 111 and 113 because tickets will be in the path of the light supplied by light sources 110 and 112. Therefore, no output signal will be provided from "And" circuits 115 and 116. As shown in this Figure, an "On" signal is also provided to input of the "And" circuits 115 and 116, the "On" signal representing a D.C. voltage indicating that the batch reader has been turned on. If the stacker which is feeding tickets empties, the light beam is detected by one of the photo detectors (e.g., 111) to turn on one of the "A" circuits (e.g., 115) which will in turn energize the rotary solenoid to switch the member 50 away from the full stacker so that now it can begin feeding tickets to the turret 30.

In order to prevent the member 50 from continuously moving between stackers 40 and 41 if both are empty, there is provided "And" circuit 117 and an inverter 118 which are coupled to "And" circuits 115 and 116. Thus, when devices 111 and 113 indicate that both stackers are empty, "And" circuits 115 and 116 will be prevented from providing an output signal to activate solenoid 48. The photo detectors 111 and 113 may also be connected to an alarm or light to indicate to an operator that the stackers are empty.

Reference should now be had to FIGS. 12 and 13 which discloses the logic utilized to control the operation of the reader of this invention. Like numbers are used in these figures to indicate devices previously described in the above description. The reader according to this invention is preferably operated under computer control, as for example a general purpose computer shown at 150 (e.g., computers sold by Honeywell, Digital Equipment Corp., and others can be utilized to provide control signals). The computer forms no part of this invention and is merely used to provide control signals to cause the reader to perform the functions previously described.

In order to rotate the turret 30 through its shaft 29, there is provided a motor (e.g., electric) 151 which operated through a vacuum operated clutch-brake mechanism 152 to drive the shaft 29. The clutch-brake may be of the type shown in U.S. Pat. No. 3,378,121, and sold by the P.G. Foret Inc. of Sudbury, Mass. Instead of a vacuum operated clutch-brake mechanism, a conventional electromechanical or other clutch-brake or motor drive can be used to intermittently rotate the shaft 29.

Coupled to and driven by the drive shaft 29 there is provided a timing plate 155 for controlling the internal operation of the reader. The timing plate of solid non-light transmissive material has a plurality of slots 156 for permitting the passage of light therethrough. Positioned about the timing plate for deriving control signals are three pair of photo or light sensors and light sources shown at 161*a* and 161*b*, 162*a* and 162*b* and 163*a* and 163*b*. The light source and sensor 161*a* and 161*b* are utilized to generate a "position signal" indicating that the turret is positioned such that each of the receivers are positioned in line with or at the stations I–IV. The light source and sensor 162*a* and 162*b* are utilized to generate a "½ Index Signal" to indicate that the turret receivers have moved substantially one-half the distance between adjacent stations. The light source and sensor 163*a* and *b* are utilized to generate a "Halt Signal" when the turret receivers are almost in position at the next station to which they are being rotated. These sensors 161*b*–163*b* are stagger-positioned above or below the timing plate such that as the timing plate rotates the "½ Index Signal" will first appear as one of the slots 156 permits light to be received, thereafter the sensor 162*b* will detect the presence of light to generate a "Halt Signal" and upon the stopage of the turret the "Position Signal" will be generated by the sensor 161*b* as light is received due to the motion of the slot 156. Thus the signals "Position," "½ Index,"and "Halt" appear sequentially, but do not (preferably) overlap in time.

In order to describe the operation of the system and the processing of one ticket through the reader, it should now be assumed that the ticket receivers 31 are each initially positioned (aligned with respect to one station) and that one of the receivers is positioned at station I under a stacker having one or more tickets positioned therein. It should also be assumed that a vacuum pump shown at 170 has been turned on and that all the electronics have been energized (power on) so as to be able to start functioning according to the presence or absence of control signals. At 171*a*–*f* there are shown a plurality of bistable multivibrators and solenoid valve arrangements (both well known in the art) which are coupled together to control the application of vacuum (suction) through coupling means 100 to each of the receivers 31. When an "On" signal appears at the input to the bistable valve, the multivibrator changes state and opens the solenoid valve to apply suction to the selected receivers 31. When an "Off" signal appears at the input to devices 172, the valve is closed off.

Due to the initial position of the timing plate 156, a "Position" signal is first generated which causes the valve 171*a* to open and apply suction to draw a ticket from the stacker positioned at station I onto the receiver 31 positioned at station I. The presence of the "Position" also causes the computer to provide a "Drive" signal which causes "And" circuit 175 to turn on thus causing bistable multivibrator 176 to switch to cause the "Clutch on" signal to be generated. The "Clutch on" signal causes the clutch-brake 152 to connect the shaft 29 to the motor 151 thereby rotating the turret 30 and the timing plate 156 clockwise. In addition, the computer applies a drive pulse to a six stage shift register comprising flip-flop 180*a*–180*f* which initially has a "bit" stored therein in flip-flop 180*a*[e.g., T is a 1 (high) and $\overline{T}$ is a "0" (low)]. The presence of the drive pulse causes the "bit" to be shifted to the next stage 180*b* such that T goes high and $\overline{T}$ goes low. As the timing plate 156 rotates about half the distance between stations, the "½ Index" signal is derived. This signal causes bistable and valve 171*a* to close and causes bistable and valve 171*b* to open as "And" circuit 181*a* turns on thus continuously applying vacuum to retain the ticket on the receiver 31 as the receiver carrying the ticket moves between stations because of the overlap in the means 34 and 101 as the turret rotates. After the turret rotates to a point where it is almost at the next station, the "Halt" signal is generated. The "Halt" signal is applied to bistable 176 to cause the "Brake on" signal to be applied, thus stopping the turret receiver carrying the ticket at station II. Again a "Position" signal is generated which now causes the receiver carrying the ticket to move to station III as the above mentioned signals reappear. "And" circuits 181*b*–181*c* are provided to gate signals into the bistable and valves 171*b*–171*f*.

When the receiver 30 carrying the ticket arrives at station III (magnetic head read station) and is positioned, the next "position" signal generated causes positioning of the ticket and then reading of the data stored on the ticket portion 21. The bistable and valve 171*c* are operated in a manner such that as the reading device 60 moves downwardly, the valve 171*c* is closed to remove vacuum retaining the ticket on the receiver. This is accomplished to permit the aligning means 73 of the reading device 60 to accurately position the ticket without the interference of suction as the aligning means or tip 73 enters the aligning hole 22 of the ticket. In order to accomplish the above, the computer 150 is adapted (programmed) to recognize the third "Position" signal and provide two signals, the first of which Head Start is applied to a clutch-brake 182 (the same type as 152) to cause the motor 70 to rotate the shaft 68 and cam 67. As the cam 67 rotates, the magnetic read head 60 moves downward. At the same time the computer provides a Head Start Vacuum Off Signal to "And" gate 186 and also the T output (which is high) from flip-flop 180*c* is provided to the "And" gate 186. "And" gate 186 thus provides a signal to turn off the bistable and valve 171*c* (controlling vacuum) at station III. Thus as the head 60 moves downwardly, the aligning means 73 is permitted to enter the hole 22 of the ticket and align the ticket without having to overcome the suction caused by the vacuum. The motor 75 is provided with a motor drive signal from an external power source and in the preferred embodiment is continuously running and thus the readout heads 72A and 72B are always rotating.

The shaft 68 also carries a timing disc 190 having a timing slot 191 which cooperates with a light source 193A and a photo sensor 194A to generate a "Computer Read" signal to iniate reading of the magnetically stored data on the ticket.

The "Computer Read" signal is generated when the disc slot 191 has rotated 90° from its initial start position so that the slot 191 permits light from light source 193A to impinge upon photo sensor 194A. The cam 67 and the disc 190 continue to rotate, but the head remains down in reading position because of the shape of the cam which is cut such that the head dwells in reading position. At 270° of rotation the cam is cut such that the head 60 begins to rise and in addition the disc 190 continues to rotate. As the disc 190 rotates, the slot 191 gets to 360° which causes a "Stop" signal to be generated by the provision of a light source 193B and photo sensor 194B. The "Stop" signal is applied to the clutch-brake 182 to stop cam 67 motion and thus position the read head 60 at its initial position.

The signal generated by the timing disc at 90° also is applied to "And" circuit 197 to turn bistable and valve 171*c* to reapply vacuum. In the preferred embodiment the leading edge of the slot causes vacuum to be reapplied and the rear edge of the slot 191 causes the computer to initiate reading. The usual type of leading and lagging waveform detectors are utilized.

It should be understood that the computer can be programmed to read the ticket more than one time (e.g., two or three times) in the event the information read on the first reading appears to be incorrect. It has been found that second or third reading of a presumably incorrect ticket considerably reduces the number of tickets rejected.

At this time, another "Drive" pulse is generated to move the ticket to station IV as previously described. Since station IV is a blank station in the embodiment shown, another "Drive" pulse is generated in the same manner as previously described to position the ticket at station V.

Station V comprises a stacker 80 as previously described, for collecting tickets which the computer has not been able to read properly or to collect tickets which appear to have erroneous information stored thereon. In order to store these tickets in the stacker, the computer generates a "Select Stack" signal which is simultaneously applied to an "And" gate 200. With the "Position signal" on, solenoid valve 201 opens to permit a fluid source 202 to provide fluid to operate cylinder 81 and cause member 87 to lift the ticket 20 into the stacker as previously described.

If the ticket 20 is not to be stacked, the ticket will proceed to station IV on the reception of the next drive signal. Station VI comprises a drop-off means 92 as previously described. In order to operate the drop-off cylinder 90 and the ticket pusher means 91, the computer provides a "Select Drop-off" signal which is simultaneously applied to an "And" gate 210 with the "Position" signal. "And" gate 210 then provides a signal to open solenoid valve 211 to control the flow of fluid from source 202 into the cylinder 90 to cause the ticket to be pushed out of the receiver 30 as previously described.

When the tickets are being stacked in stacker 80, vacuum is removed at station V by the provision of a signal from an "And" gate 220 responsive to the simultaneous presence of signals "T" from flip-flop 180*e*, "Position" and "Select Stack." During the drop-off procedure vacuum is removed because of the presence of the "Position" signal at bistable and valve 171*f*.

This completes a description of the operation of the reader of this invention. The reader is preferably operated in its most preferred form such that vacuum is not applied to any receiver not containing a ticket. It should be understood that a number of tickets are generally simultaneously processed although one ticket may be processed as described herein.

It will thus be seen that the objects set forth above, among those made apparent from the preceding description, are efficiently attained and, since certain changes may be made in the above construction(s) without departing from the spirit and scope of the invention, it is intended that all matter contained in the above description or shown in the accompanying drawing(s) shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

We claim:

1. In a system for reading information on tickets comprising transport means providing a backing for and supporting a ticket so that the ticket will not fall away therefrom due to the force of gravity, said transport means movable to transport a ticket from a ticket supply station from which a ticket is fed onto said transport means to a reading station for reading the information on the ticket, vacuum means coupled to said transport means for applying vacuum to pull said ticket against said transport means, means for moving to and stopping said transport means at both of said stations, ticket reading means positioned at said reading station for reading a ticket supported by said transport means, aligning means for aligning a ticket supported by said transport means with respect to said ticket reading means, control means for controlling the application of vacuum from said vacuum means so as to (1) apply vacuum to pull the ticket against the transport means during movement of said transport means between stations, and (2) prevent the application of vacuum from said vacuum means during an interval of time after the transport means has been stopped at said reading station to position a ticket at said reading station, and means for moving said aligning means into contact with a ticket supported by said transport means and align the ticket with respect to said ticket information reading means during the interval of time said control means prevents the application of vacuum from said vacuum means.

2. In a system according to claim 1 in which the means for reading and the means for aligning comprises a device having an aligning pin for entering in aligning hole of a ticket and a magnetic head adapted to rotate to read information on said ticket stored on a magnetic media supported by the ticket and means for rotating said magnetic head.

3. In a system according to claim 2 in which said control means reapplys vacuum from said vacuum means during an interval of time after the ticket has been aligned by said aligning means and while the ticket is still at said reading station.

4. In a system according to claim 2 in which said means for moving the aligning means also moves and said magnetic head into position with respect to a ticket to read the information carried by the ticket.

5. In a system according to claim 4 in which said control means reapplys vacuum from said vacuum means during an interval of time after the ticket has been aligned by said aligning means and while the ticket is still at said reading station.

6. In a system according to claim 5 including means for rotating the reading read during said interval of time after the ticket has been aligned and while the ticket is still at said reading station.

7. A system for processing a ticket based on the information stored on the ticket, said system comprising a rotatable disc having top and bottom surfaces and a curved side surface between said top and bottom surfaces, at least one ticket receiver set into the top surface of the disc so that a ticket received thereby is supported on its face, means for rotatably moving said disc and ticket receiver between a plurality of stations in order to process a ticket carried within said receiver, means for feeding a ticket into said receiver at a first of said stations, reading means for reading the information stored on the ticket at a second of said stations, first means for collecting the tickets at a third of said stations and second means for collecting the tickets at a fourth of said stations, and pusher means responsive to said reading means and located at said third and fourth stations for pushing said ticket out of said ticket receiver into the first or second collecting means depending upon the information stored on the ticket and read by said reading means.

8. A system according to claim 7 in which said pusher means for pushing said ticket out of said receiver, passes through an ejector hole opening at the bottom surface of the disc, then extending through the disc and then opening at the bottom of the receiver.

9. A system according to claim 7 in which said system includes vacuum means, in which said disc includes passages internal thereto coupled to said vacuum means and opening at the bottom of said receiver to apply suction to retain the ticket within the receiver during movement of the disc between stations.

10. A system according to claim 9 in which said reading means for reading comprises a rotating magnetic reading head adapted to be moved into proximity to the ticket.

* * * * *